(12) United States Patent
Mathews et al.

(10) Patent No.: US 9,215,492 B2
(45) Date of Patent: Dec. 15, 2015

(54) ADVERTISEMENT ANALYSIS AND ERROR CORRELATION

(71) Applicant: Verizon Patent and Licensing Inc., Basking Ridge, NJ (US)

(72) Inventors: Robin Montague Mathews, Westford, MA (US); Michael Patrick Ruffini, Methuen, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 68 days.

(21) Appl. No.: 13/715,390

(22) Filed: Dec. 14, 2012

(65) Prior Publication Data

US 2014/0173650 A1    Jun. 19, 2014

(51) Int. Cl.
*H04N 7/167*  (2011.01)
*H04N 21/433* (2011.01)
*H04N 21/44*  (2011.01)
*H04N 21/6543* (2011.01)
*H04N 21/81* (2011.01)

(52) U.S. Cl.
CPC ..... *H04N 21/4331* (2013.01); *H04N 21/44016* (2013.01); *H04N 21/6543* (2013.01); *H04N 21/812* (2013.01)

(58) Field of Classification Search
CPC   H04N 21/812; H04N 21/25883; H04N 7/165
USPC ................. 725/32–36; 709/217–232
See application file for complete search history.

(56) References Cited

U.S. PATENT DOCUMENTS

| | | | | |
|---|---|---|---|---|
| 7,500,258 B1 * | 3/2009 | Eldering | ................ | H04N 7/165 725/134 |
| 7,584,490 B1 * | 9/2009 | Schlack | ............. | H04N 7/17318 725/10 |
| 7,810,114 B2 * | 10/2010 | Flickinger | .............. | G06Q 30/02 725/32 |
| 8,108,895 B2 * | 1/2012 | Anderson | .............. | G06Q 30/02 705/14.4 |
| 8,116,616 B2 * | 2/2012 | Plotnick | ............... | G11B 27/005 386/343 |
| 8,151,295 B1 * | 4/2012 | Eldering | ............ | H04N 21/4331 725/34 |
| 8,170,122 B2 * | 5/2012 | Hamilton | ......... | H04N 21/23608 375/240.26 |
| 8,170,401 B2 * | 5/2012 | Connery | .............. | G11B 27/034 386/328 |
| 2007/0039018 A1 * | 2/2007 | Saslow | ................... | G06Q 30/02 725/22 |
| 2008/0192736 A1 * | 8/2008 | Jabri | .................... | G11B 27/034 370/352 |
| 2008/0208881 A1 * | 8/2008 | Boyle | ..................... | G06Q 30/02 |
| 2009/0030802 A1 * | 1/2009 | Plotnick et al. | ................. | 705/14 |
| 2009/0217318 A1 * | 8/2009 | VerSteeg et al. | ................ | 725/32 |
| 2010/0251278 A1 * | 9/2010 | Agarwal | ............... | H04H 20/14 725/9 |
| 2012/0047542 A1 * | 2/2012 | Lewis | .............. | H04N 21/44016 725/97 |

* cited by examiner

*Primary Examiner* — Annan Shang

(57) ABSTRACT

A method includes receiving, from an advertisement monitor device, notification of a video stream that includes an advertisement insertion event. The advertisement insertion event includes a scheduled transition between the video program and at least one targeted advertisement associated with a corresponding target group of set top boxes. The method includes preparing resources to receive the video stream. A notification is sent to the advertisement monitor device to begin transmitting the video stream. The video stream, a unique identifier (ID) associated with the video stream and associated metadata for the video stream is received. The method includes analyzing the video stream to identify at least one issue in association with the advertisement insertion event, and generating a report that includes the identified at least one error, the unique ID, and the associated metadata for the video stream.

20 Claims, 8 Drawing Sheets

FIG. 7

| AD BREAK 702 | GROUP 704 | AD 706 | ISSUE 708 | TIME 710 | AD LINK 712 |
|---|---|---|---|---|---|
| AD BREAK 1 | GROUP 704-a | AD 706-a | ISSUE 1 | TIME 1 | LINK 712-a |
| AD BREAK 1 | GROUP 704-b | AD 706-b | ISSUE 2 | TIME 1 | LINK 712-b |
| AD BREAK 1 | GROUP 704-c | AD 706-c | ISSUE 3 | TIME 1 | LINK 712-c |
| AD BREAK 2 | GROUP 704-a | AD 706-a | ISSUE 4 | TIME 2 | LINK 712-d |
| AD BREAK 2 | GROUP 704-d | AD 706-e | ISSUE 5 | TIME 2 | LINK 712-e |
| AD BREAK 3 | GROUP 704-c | AD 706-a | ISSUE 6 | TIME 2 | LINK 712-a |

700

ADVERTISEMENT ANALYSIS AND ERROR CORRELATION

BACKGROUND

Video service providers currently provide multiple services and programs, including cable television, network television, and video-on-demand, to their customers. In some instances, individual customers may receive combinations of these services from a single video service provider. Video service providers manage relationships with their customers using customer accounts that correspond to the multiple services.

BRIEF DESCRIPTION OF THE DRAWINGS

FIG. 7 is a table of issue correlation information;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may implement issue reporting and correlation for advertisement insertion events. Advertisement insertion events occur when targeted advertisements ("ads") are inserted in video streams. The system identifies a dynamic list of available video streams and analyzes the video streams to determine issues based on scheduled advertisements. The system correlates issues to recorded advertisement insertion events. The system may also provide feedback to monitor particular video streams based on detected issues.

As used herein, the terms "user," "consumer," "subscriber," and/or "customer" may be used interchangeably. Also, the terms "user," "consumer," "subscriber," and/or "customer" are intended to be broadly interpreted to include a user device or a user of a user device.

Figure 1:
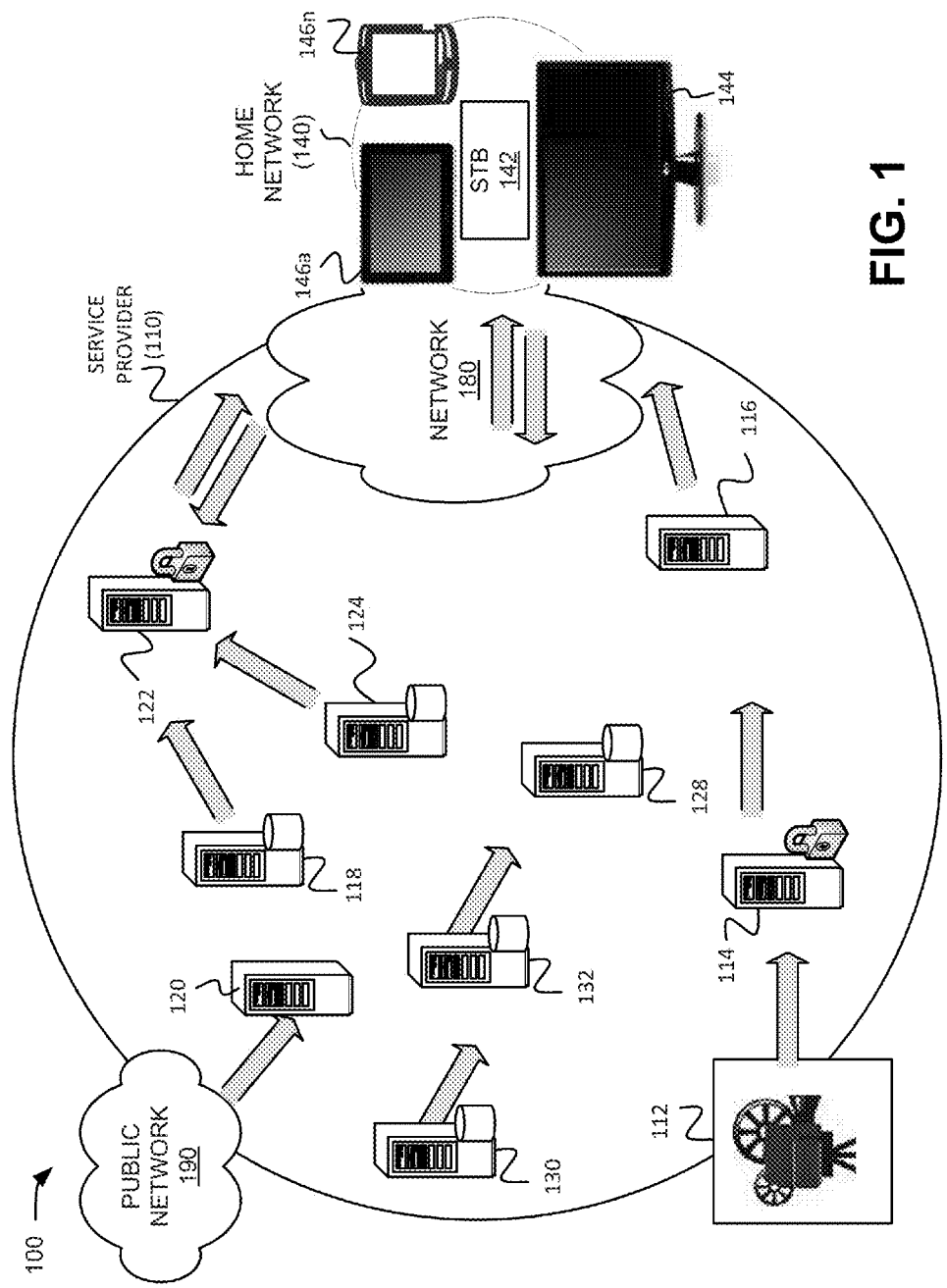
FIG. 1 illustrates an exemplary network in which systems and methods described herein may be implemented.

FIG. 1 illustrates an exemplary environment 100 in which systems and/or methods described herein may be implemented. As shown in FIG. 1, environment 100 may include a video service provider network 110, a home network 140, an access network 180, and a public network 190. Video service provider network 110 may include a content provider 112 (or alternatively, video service provider network 110 may receive video content from content provider 112), a content processing system 114, a content delivery system 116, a search server 118, a guide server 120, an application server 122, a profile server 124, a license server 128, an advertisement insertion server 130, and an advertisement monitor and issue correlation system 132. Home network 140 may include one or more STBs 142, televisions 144, user devices 146a through 146n, and/or personal computers (not shown). Devices and/or networks of FIG. 1 may be connected via wired and/or wireless connections.

Video service provider network 110 may collect, generate, and provide video content to subscribers of a video service. Video content may include, for example, encoded video content in any of a variety of formats, including, for example, Multiview Video Coding (MVC), Moving Picture Experts Group (MPEG)-2 TS, MPEG-4 advanced video coding (AVC)/H.264, etc. Video service provider network 110 may also provide support services for the video service, including advertisement monitoring, authentication, authorization, and billing of subscribers for particular video services.

Content provider 112 may include one or more providers of video content. For example, content provider 112 may include a television network, a cable television station, a film distributor, etc. Content provider 112 may provide video content to content processing system 114 in a variety of formats, such as a MPEG video, etc.

Content processing system 114 may store and process video content. Content processing system 114 may encode video content using, for example, public/private keys. Content processing system 114 may also transcode the video content. Content processing system 114 may store video content in an encrypted and/or encoded form.

Content delivery system 116 may provide video content, instructions, and/or other information to home network 140 and associated devices, such as set-top-box (STB) 142 and user devices 146a-146n (collectively referred to as user devices 146 and individually as user device 146). In one implementation, content delivery system 116 may provide broadcast video content via a quadrature amplitude modulation (QAM) based system that may be limited in bandwidth capacity (i.e., a number and/or quality of channels may be limited based on the capacity of video service provider network 110). In other implementations, content delivery system 116 may provide video content via adaptive coding modulation (ACM) or via Internet protocol (IP), etc.

Content delivery system 116 may temporarily store and provide content requested by user device 146 and/or STB 142. In one implementation, access to content delivery system 116 (e.g., by STB 142 and/or user device 146) may be restricted by a service provider that operates content delivery system 116. For example, access to content delivery system 116 may be restricted to particular users with particular subscription packages and enforced by, for example, password protection, device identifiers (for user devices 146a-146n, STB 142 and/or home network 140), and/or application identifiers (e.g., residing on user devices 146a-146n, STB 142 and/or portable media). Content delivery system 116 may include other devices (not shown), such as a content server, a policy management server, a streaming device, a router, a content cache, etc.

Search server 118 may provide support for an integrated video search function (executed by STBs 142, televisions 144, one or more user devices 146, and/or personal computers at home network 140), for searching among video content that may be provided to subscribers by a content delivery system 116, and video content that may be provided by an associated external network, such as the Internet. The video content may be provided at particular subscribed channels (i.e., an ongoing live broadcast that is part of the subscriber's package), on a pay-per-view basis, or "on demand" (i.e., particular content may be provided upon user request).

Guide server 120 may provide an integrated video guide to subscribers. The integrated video guide may include integrated video content from a video service provider network 110, such as a QAM based system, and from an additional network, such as the Internet. The integrated video guide may provide listings of channels, viewing times, descriptions of video content, access restrictions, payment requirements, etc.

Application server 122 may provide one or more applications that may allow subscribers to browse, purchase, rent, subscribe, and/or view video content. Application server 122 may authenticate a user who desires to purchase, rent, or subscribe to video content. In one implementation, application server 122 may interact with STB 142 or user device 146 using the hypertext transfer protocol (HTTP) or the secure HTTP (HTTPS). In another implementation, application server 122, STB 142 and user device 146 may interact with one another using another type of protocol.

Profile server 124 may store user profile information for users (e.g., users of user devices 146). The user profile information may include, got example, login information (e.g., a user identifier and a password), targetable information associated with the user (e.g., types of products purchased by the user, income of the user, household characteristics, whether the user is a pet owner, etc.), demographic information, billing information, address information (including zip codes), types of services to which the user has subscribed, a list of video content purchased by the user, a list of video content rented by the user, a list of channels or video content to which the user has subscribed, a list of users associated with the user account, ratings of video content by the user, a user device identifier (e.g., a media player identifier, a mobile device identifier, a set top box identifier, a personal computer identifier) for devices, such as STB 142, user device 146, etc. Application server 122 may use the user profile information from profile server 124 to authenticate a user (or associated users) and may update the user profile information based on the user's activity (e.g., with the user's express permission).

License server 128 may provide key and license management. License server 128 may communicate with user devices 146 and/or STB 142 directly or via application server 122. For example, license server 128 may receive a request from STB 142 for a license relating to video content that STB 142 has downloaded. The license may include information regarding the type of use permitted at user device 146 or STB 142 (e.g., a purchase, a rental, limited shared usage, or a subscription) and a decryption key that permits STB 142 to decrypt the video content or application. In one implementation, the communications between license server 128 and STB 142 may be conducted over a secure channel, may include the use of public and private keys, or may include other forms of secure communication.

Advertisement insertion server 130 may use radio frequency (RF)/QAM channels to distribute advertisements to STBs 142 via "hidden" (from the point of view of the customer) QAM channels provided in addition to video streams directly associated with particular channels or programs. An advertisement insertion event occurs when advertisement insertion server 130 instructs STBs 142 to tune to these hidden channels at scheduled advertisement breaks to view/display addressable or zoned advertisements specific to their target group (these instructions may be sent to the STB 142 via an in-band signal in a video (e.g., broadcast) stream provided by content delivery system 116). Advertisement insertion server 130 may use the user profile information from profile server 124 to provide targeted advertisements to STBs 142 associated with particular groups of subscribers. The STBs 142 may tune back to RF/QAM channels of the video stream at the completion of the advertisement break (or alternately, to another targeted ad).

Advertisement monitor and issue correlation system 132 may implement issue reporting and correlation for advertisement insertion events. Advertisement insertion events occur when targeted advertisements ("ads") are inserted in video streams. Advertisement monitor and issue correlation system 132 may identify a dynamic list of available video streams and analyze the video streams to determine issues based on scheduled advertisements. Advertisement monitor and issue correlation system 132 may correlate issues to recorded advertisement insertion events. Advertisement monitor and issue correlation system 132 may also provide feedback to monitor particular video streams based on detected issues with the advertisement insertion events. Advertisement monitor and issue correlation system 132 is described below with respect to FIG. 2.

Home network 140 may include one or more devices that transmit requests to content delivery system 116, search server 118, guide server 120, application server 122, profile server 124, and/or license server 128, and receive information from content delivery system 116, search server 118, guide server 120, application server 122, profile server 124, advertisement monitor and issue correlation system 132, and/or license server 128. Home network 140 may include, for example, one or more STBs 142, televisions 144, one or more user devices 146, and/or personal computers. Home network 140 may also include other devices (not shown), such as additional media storage devices, a home router, a gateway (e.g., an optical network terminal (ONT)), etc.

STB 142 may receive content from content delivery system 116, and/or an external network, such as the Internet, and output the content to TV 144 and/or user devices 146a-146n. For example, STB 142 may receive a range of channels from content delivery system 116 via QAM. STB 142 may also receive hidden QAM channels, for example, from content delivery system 116. STB 142 may output the content as on-demand content and/or live TV content (i.e., ongoing content that may not be available on an on-demand basis). STB 142 may include a component (e.g., a cable card or a software application) that plugs into a host device (e.g., TVs 144, and/or other devices, such as personal computers, mobile telephones, etc.) that allows the host device to play content. STB 142 may also be implemented as a home theater personal computer (HTPC), an optical disk player (e.g., digital video disk (DVD) or Blu-Ray™ disc player), a cable card, etc. STB 142 may receive commands from other devices in environment 100, such as a remote control (not shown) and user device 146. STB 142 may include one or more digital video recorders (DVRs) that allow STB 142 to record content and to playback the recorded content at a later time. In one embodiment, STB 142 may include a microphone and/or a camera.

TV 144 may include speakers as well as a display. TV 144 may play content, for example, received from STB 142. While some embodiments described below may use TV 144 to play content, other embodiments may use any device (e.g., a computer or a mobile phone) to play/provide content.

User device 146 may include any device capable of communicating via a network, such as home network 140 and/or access network 180. User device 146 may include an interactive client interface, such as a graphic user interface (GUI. User device 146 may include digital rights management (DRM) functionality to retrieve security information (e.g., decryption keys) and decrypt protected content received from content delivery system 116. Examples of user device 146 may include a mobile phone, a tablet, a personal computer, or another device that may receive video program related items, such as video program related applications and video program related content, and provide the video program related items at user device 146.

Access network 180 may provide customers with multimedia content from (e.g., from content delivery system 116). Access network 180 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 1, access network 180 may include a number of networks that provide services to home network 140. In one implementation, access network 180 may be connected to home network 140 via an optical communication link, such as an optical fiber provided to home network 140. In another implementation, access network 180 may be connected to home network 140 via a coaxial cable. In still another implementation, access network 180 may be connected to home network 140 via a wireless (e.g., satellite) connection.

Public network 190 may include a WAN, an intranet, the Internet, a telephone network (e.g., the Public Switched Telephone Network), or a combination of networks. Public network 190 may include, for example, an untrusted network, such as the Internet. Public network 190 may further include network devices such as routers, switches, and/or firewalls.

While FIG. 1 shows a particular number and arrangement of networks and/or devices, in practice, environment 100 may include additional networks/devices, fewer networks/devices, different networks/devices, or differently arranged networks/devices than are shown in FIG. 1. For example, content delivery system 116 may be implemented as multiple devices.

In implementations described herein, a system and method for inserting targeted advertisements into video streams and monitoring the targeted advertisements is disclosed. The system and method may be implemented in conjunction with advertisement monitor and issue correlation system 132, which combines an advertisement server device, a dynamic scheduler and pseudo-client devices that emulate protocols associated with STBs 142 as described with respect to FIG. 2.

Figure 2:
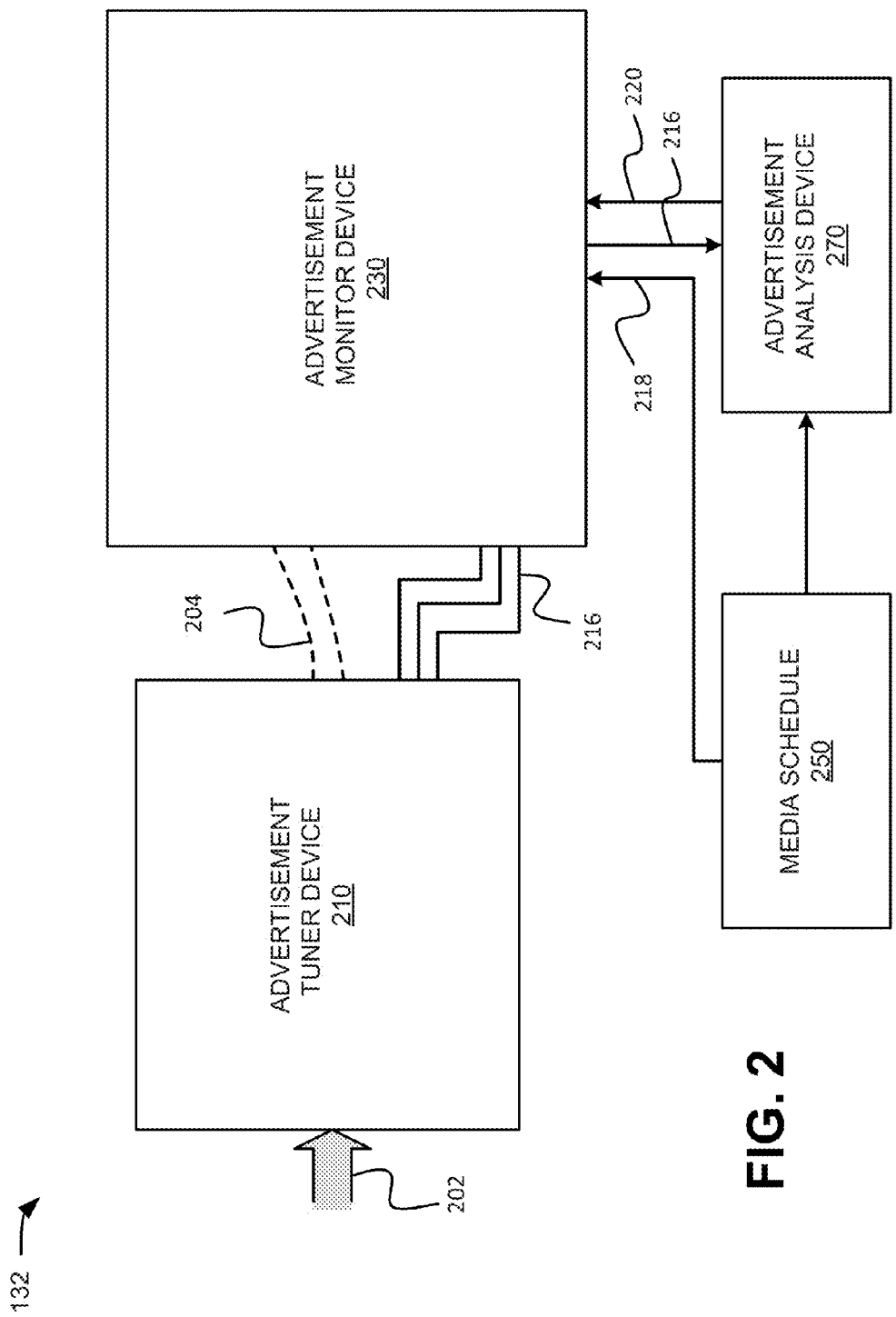
FIG. 2 illustrates an exemplary advertisement monitor and issue correlation system in which systems and methods described herein may be implemented.

FIG. 2 illustrates a functional block diagram of advertisement monitor and issue correlation system 132 in which systems and/or methods described herein may be implemented. As shown in FIG. 2, advertisement monitor and issue correlation system 132 may include an advertisement tuner device 210, an advertisement monitor device 230, a media schedule device 250, and an advertisement analysis device 270.

Advertisement tuner device 210 may receive a video band 202 and tune to particular video streams 216 associated with target customers. Advertisement tuner device 210 may include a video tuner bank that may tune to different video streams based on input 204 received from (components of) advertisement monitor device 230. Advertisement tuner device 210 may tune to particular video streams 216 that may be scheduled to display advertisements. The video streams 216 may include in-band signaling targeted to particular STBs 142 associated with particular users. The targeted advertisements may be provided in association with particular targeted customers (or customer STBs 142). The advertisements may be scheduled to be displayed at advertisement breaks in programs received by the STBs 142. In one implementation, advertisement tuner device 210 may be implemented using a QAM bank that includes multiple QAM tuners, such as described with respect to advertisement tuner device 400 and FIG. 4 below.

Advertisement monitor device 230 may monitor the targeted advertisements that are inserted into video streams associated with particular customers to ensure that the targeted advertisements are delivered without any video, audio or timing issues. Advertisement monitor device 230 may select and monitor video streams 216 associated with target groups (of subscriber devices, i.e., STBs 142). Advertisement monitor device 230 may capture media based on a dynamic schedule 218 (received, for example, from media schedule device 250) for subsequent verification through review. Advertisement monitor device 230 may allow an operator of network 100 to monitor (e.g., visually, based on metadata, etc.) whether a video stream 216 corresponding to STBs 142 associated with targeted customers has tuned to a correct advertisement stream and determine whether the advertisement has been correctly displayed. Advertisement monitor device 230 may forward the media (in real-time or at predetermined or requested instances) to advertisement analysis device 270. Advertisement monitor device 230 may publish a dynamic list of available live streams that it makes available to advertisement analysis device 270. Advertisement monitor device 230 may provide associated information with the video streams 216, such as a unique identifier (ID) for each video stream 216, meta data (e.g., timestamp), etc.

Advertisement analysis device 270 may receive notifications of available streams and analyze the available live streams 216 output from advertisement monitor device 230. Advertisement analysis device 270 may perform deep packet inspection of the video streams 216 as well as video inspection to identify issues with video streams 216, such as issues based on insertion of the targeted advertisements into the video streams 216. For example, advertisement analysis device 270 may identify issues based on video quality, channel change quality (i.e., a smoothness of transition from video program to advertisement), etc. Advertisement analysis device 270 may identify issues in the media and generate reports that include a unique ID for each particular video stream 216 and published metadata. Advertisement analysis device 270 may present the report as a "selectable" document in a graphic user interface (GUI) that allows an operator to read through the issue list to request 220 the captured advertisement insertion event from advertisement monitor device 230 based on the listed issues (e.g., via hyperlink). The report may allow the operator to playback particular segments of video streams and to visually examine the segment of the video stream 216 that includes an advertisement insertion event with issues (i.e., the operator may view the program at the advertisement break to determine whether there are issues with the advertisement insertion event).

Advertisement monitor and issue correlation system 132 may be implemented with a design that incorporates pluggable protocol modules which are extensible to multiple other protocols. Advertisement monitor and issue correlation system 132 may be located in a video hub facility, such as service provider network 110 within network 100, and may be used by operators to monitor dynamic advertisement insertion in video streams 216.

Figure 3:
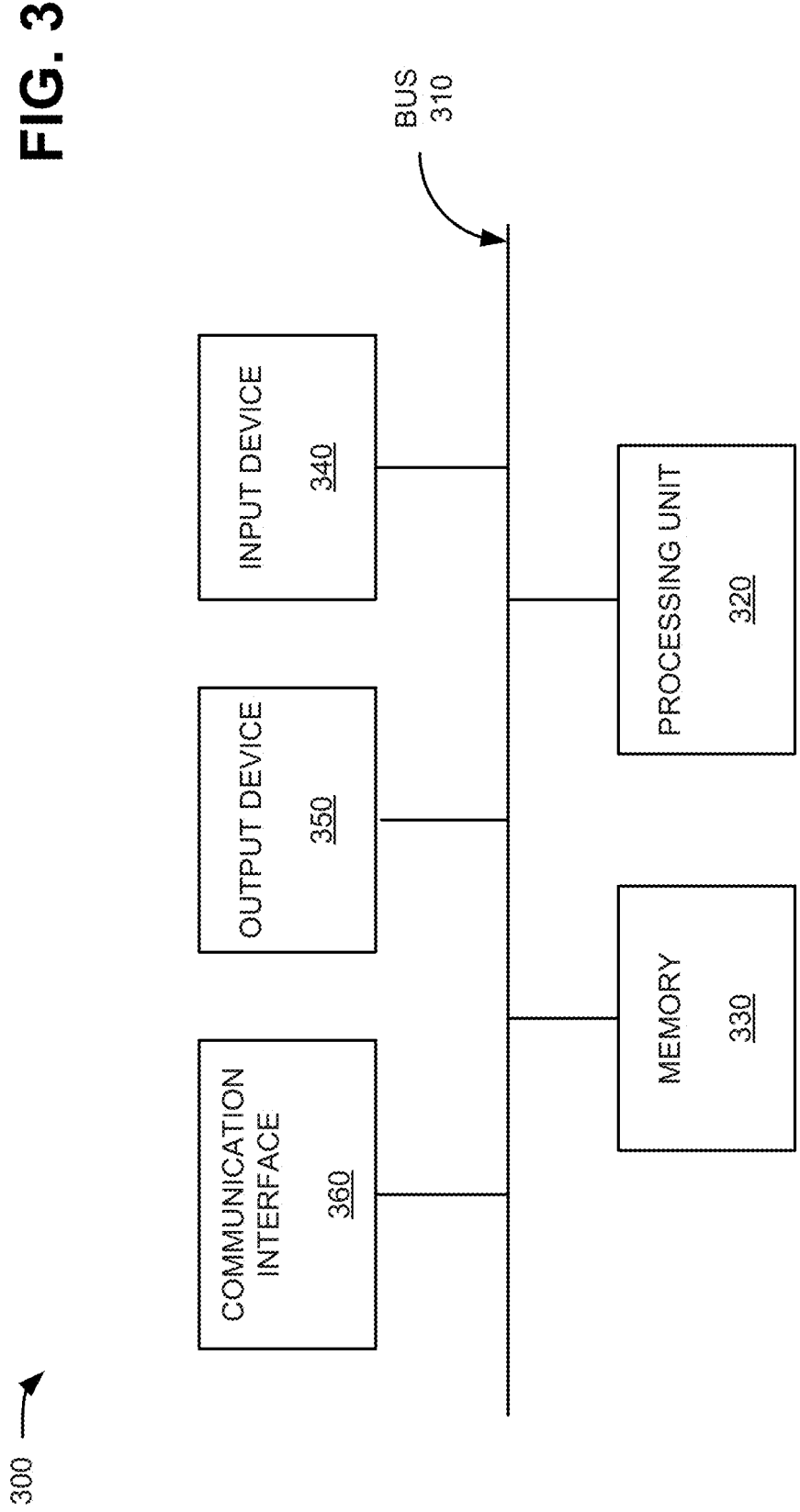
FIG. 3 illustrates an exemplary configuration of one or more of the components of FIGS. 1 and 2.

FIG. 3 is a diagram of example components of a device 300. Each of content provider 112, content processing system 114, content delivery system 116, search server 118, guide server 120, application server 122, profile server 124, license deserver 128, and/or devices in home network 140, such as STB 142, user devices 146a-146n, may include one or more devices 200. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include a transceiver that enables device 300 to communicate with other devices and/or systems. For example, communication interface 360 may include mechanisms for communicating with other devices, such as other devices of environment 100.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
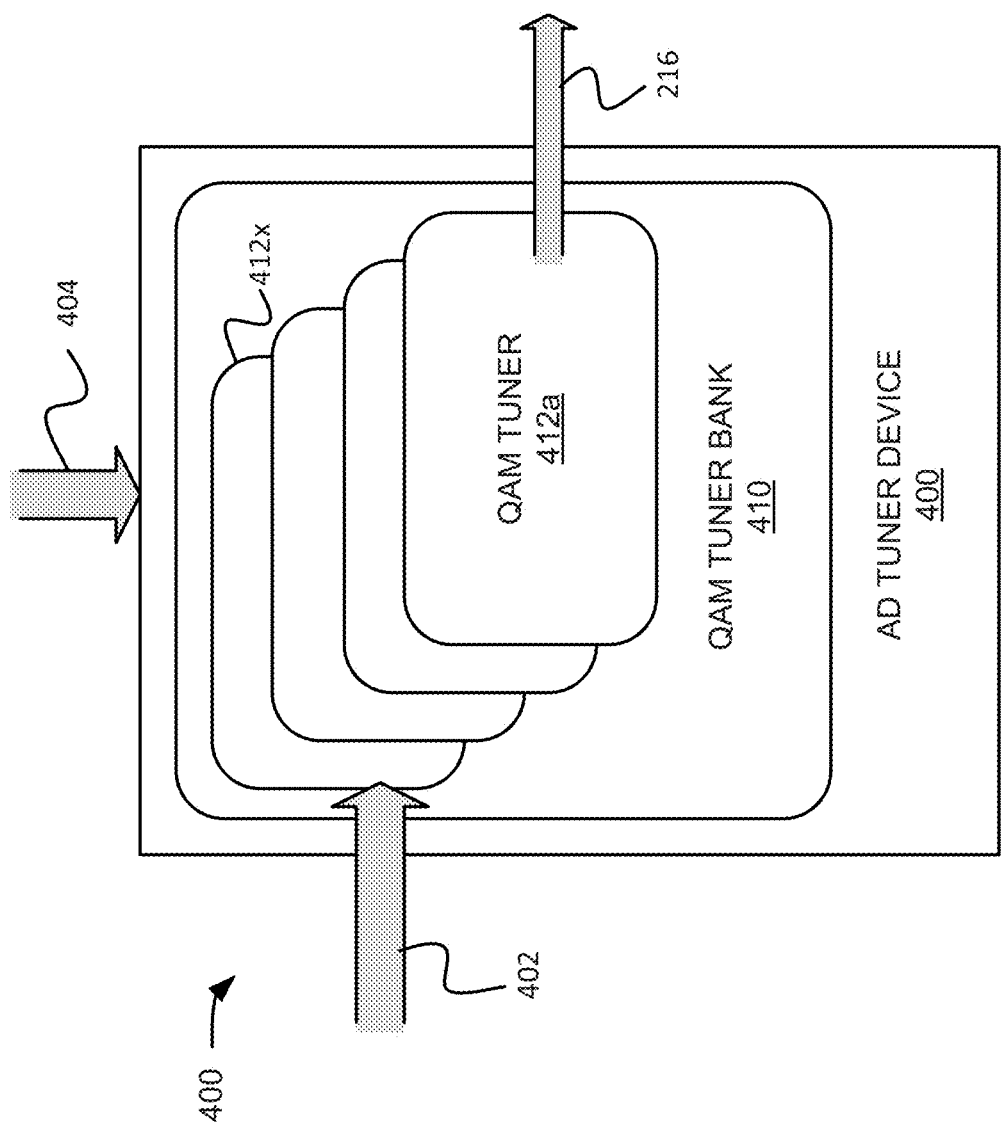
FIG. 4 is a diagram of exemplary functional components of the advertisement tuner device of FIG. 2.

FIG. 4 is a diagram of exemplary functional components of an advertisement tuner device 400. In one implementation, the functions described in connection with FIG. 4 may be performed by one or more components of device 300 (FIG. 3). As shown in FIG. 4, advertisement tuner device 400 may include a QAM tuner bank 410. Advertisement tuner device 400 may be a QAM-based implementation of advertisement tuner device 210, described with respect to FIG. 2 above. Although advertisement tuner device 400 is described with respect to QAM, in other implementations advertisement tuner devices 400/210 may use different video modulation schemes, such as ACM.

QAM tuner bank 410 may include multiple QAM tuners 412 (shown as QAM tuners 412a-412x in FIG. 4). QAM tuner bank 410 may receive QAM input 402 (e.g., from content delivery system 116). Advertisement tuner device 400 may receive tuning input(s) 404, e.g., from advertisement monitor device 230 that may tune the video streams 216 that are output from each QAM tuner 412 to a particular channel(s). QAM tuner bank 410 may receive tuning information (e.g., from advertisement monitor device 230) which precedes a scheduled advertisement break. QAM tuner bank 410 may tune to video streams 216 that include channels and signaling associated with advertisement insertion events and send the video streams 216 (that include signaling) to advertisement monitor device 230, which may include components that simulate STBs 142 associated particular customers using particular client-server protocols.

The video streams 216 may include in-band RF signaling and streams for hidden QAM channels provided by advertisers that may be targeted to owners of particular STBs 142. The video streams 216 may include advertisements based on targetable information, address information, etc., provided by profile server 124. Each video stream may correspond to a target group and client module (e.g., digital living network alliance (DLNA) protocol client modules 512 as described below with respect to FIG. 5).

Figure 5:
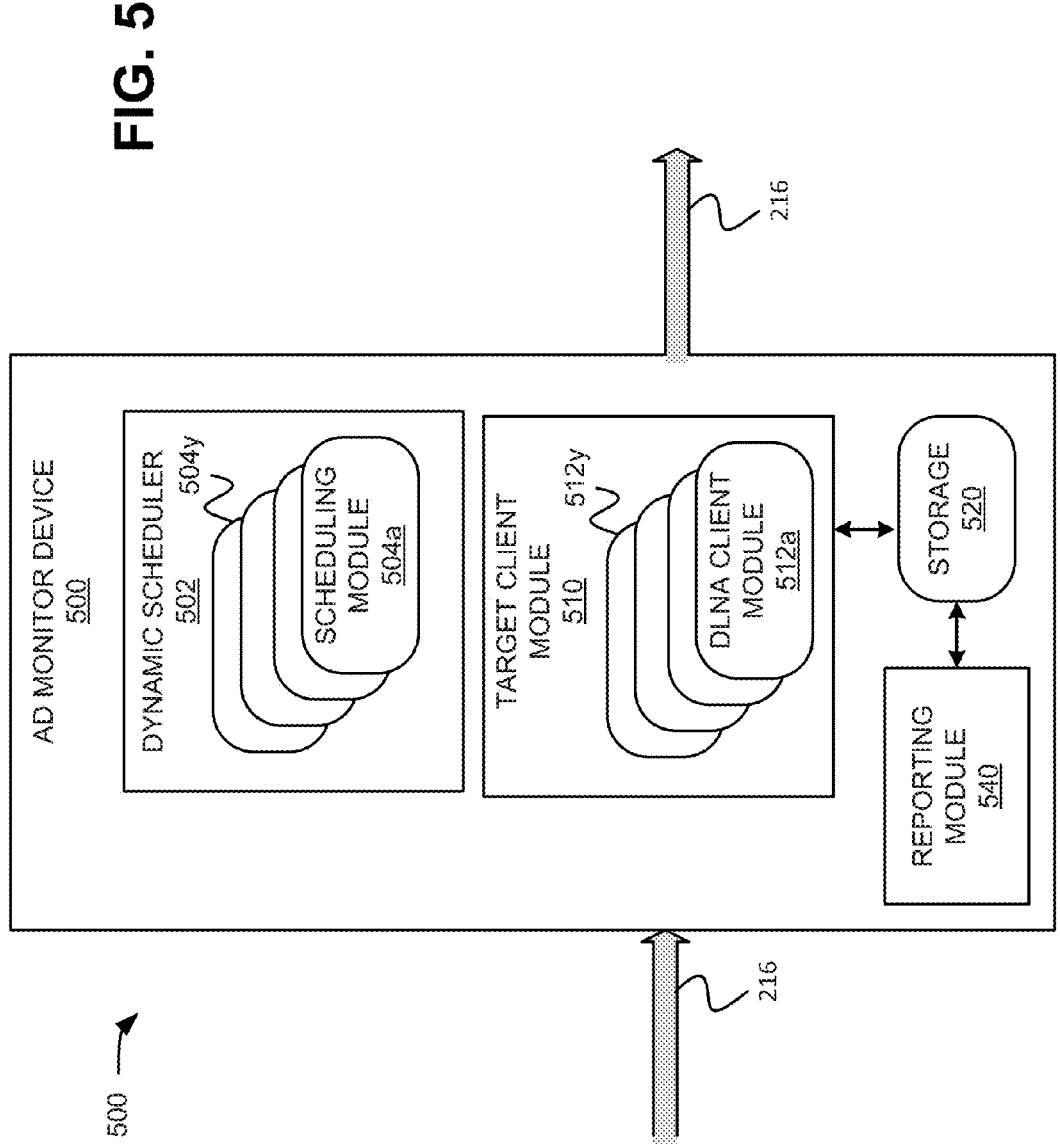
FIG. 5 is a diagram of exemplary functional components of the advertisement monitor device of FIG. 2.

FIG. 5 is a diagram of exemplary functional components of an advertisement monitor device 500. In one implementation, the functions described in connection with FIG. 5 may be performed by one or more components of device 300 (FIG. 3).

As shown in FIG. 5, advertisement monitor device 500 may include a dynamic scheduler 502, a digital living network alliance (DLNA) protocol target client module 510, a storage module 520, and a reporting module 540. Advertisement monitor device 500 may be a DLNA protocol-based implementation of advertisement monitor device 230, described with respect to FIG. 2 above. Advertisement monitor device 500 is described with respect to advertisement tuner device 400. Advertisement monitor device 500 is an implementation of advertisement monitor device 230 in accordance with DLNA specification/protocol.

Advertisement monitor device 500 may combine a scheduling module with the use of pseudo-client devices or modules that emulate protocols associated with STBs 142, such as DLNA protocol, for particular targeted customers. Advertisement monitor device 500 may assign resources for video tuning (e.g., QAM tuning based on one or multiple advertisement tuning devices 400 as described with respect to FIG. 4 above) based on different target groups and direct the generated video stream 216 to target client module 510 that places the output in storage for subsequent reporting and review purposes. Advertisement monitor device 500 may be included in a scalable implementation of advertisement monitor and issue correlation system 132 in which additional advertising tuning devices 210 may be added as a number of zones or target groups increases. For example, additional advertisement tuning devices 400 may be connected to advertisement monitor device 500 to provide video streams 216 corresponding to the additional target groups.

Dynamic scheduler 502 may schedule video streams 216 that correspond to different target groups. Dynamic scheduler 502 may include scheduling modules 504 (shown as scheduling modules 504a to 504y) that may correspond to different target groups (of subscriber devices, i.e., STBs 142). Dynamic scheduler 502 may identify pre-scheduled advertisement insertion events (e.g., upcoming advertisement breaks) on particular channels. For example, dynamic scheduler 502 may receive a video program (broadcast) schedule that includes scheduled time slots for advertisement breaks. Dynamic scheduler 502 may schedule parameter changes to QAM resources (i.e., QAM tuners 412, FIG. 4) on advertisement tuner device 400 based on the upcoming advertisement breaks. Dynamic scheduler 502 may control multiple video streams 216 (e.g., via QAM tuner bank 410) and assign variable parameters to each video stream 216 based on attributes of a target group of STBs 142 (such as a zone ID that identifies different geographical zones in which STBs 142 may be located) at different instances of time. Each QAM tuner 412 may be tuned independently from other QAM tuners 412. For example, in an instance in which subscribers are grouped into five zones based on zip code in a given video hub office, advertisement monitor and issue correlation system 132 may monitor advertisements for each zip code to enable the zoned groups to be switched to a different advertisement stream during an advertisement insertion break.

Target client module 510 may emulate protocols associated with STBs 142 of target customers. Target client module 510 may be implemented based on different protocols for set top boxes (e.g., DLNA, etc.). Target client module 510 may include DLNA client modules 512a-512y that receive and record video stream 216 for multiple targeting characteristics (i.e., each of DLNA client modules 512a-512y may capture subscriber observable video for a different targeting characteristic at a particular instance). For example, a DLNA client module 512 may be associated with a particular zip code for a particular advertisement break. Target client module 510 may store video streams 216 including advertisement insertion events locally at storage module 520 and pass any event information to reporting module 540. Target client module 510 may process and reformat the media generated from advertisement tuner device 400 and store, process and forward the media for further processing to other devices in network 100. For example, target client module 510 may process metadata indicating a target group associated with the processed video.

According to one implementation, target client module 510 may output video streams 216 to advertisement analysis device 270. For example, target client module 510 may send notification to advertisement analysis device 270, informing advertisement analysis device 270 that target client module 510 has video streams 216 to output to advertisement analysis device 270. Target client module 510 may receive confirmation from advertisement analysis device 270 that advertisement analysis device 270 has resources ready to receive the video streams 216. Target client module 510 may subsequently send the video streams 216 to advertisement analysis device 270.

Storage module 520 may store video streams 216 in conjunction with a unique ID and published metadata, such as a time stamp at which a transition from programmed content to an advertisement occurs and a time stamp of a replay position of the program preceding the advertisement insertion event (e.g., seven seconds prior to the transition). Storage module 520 may store advertisement insertion events including a time and recorded video. For example, storage module 520 may set the video stream 216 to begin replay at a predetermined time that precedes the transition to the advertisement to enable network personnel to view the transition.

Reporting module 540 may provide data regarding the advertisement insertion event, such as targeted customer groups, associated advertisers, issues with the advertisement insertion, etc. Reporting module 540 may also assign the unique ID for each video stream 216. For example, reporting module 540 may store instances at which issues were reported in association with a particular advertisement. In a network 100 in which there are more target groups than available DLNA client modules 512a-512y, reporting module 540 may receive a signal to dynamically change sampled channels based on common properties associated with identified issues to increase the probable diagnostic usefulness of sampled advertisement insertion events (e.g., reporting module 540 may send a signal to sample channels at which a particular advertisement occurs or to sample particularly configured STBs 142 to create a larger sample of probable defective signals or devices for the network professional). Reporting module 540 may forward the information to dynamic scheduler 502, which may adjust sampled target groups accordingly.

Figure 6:
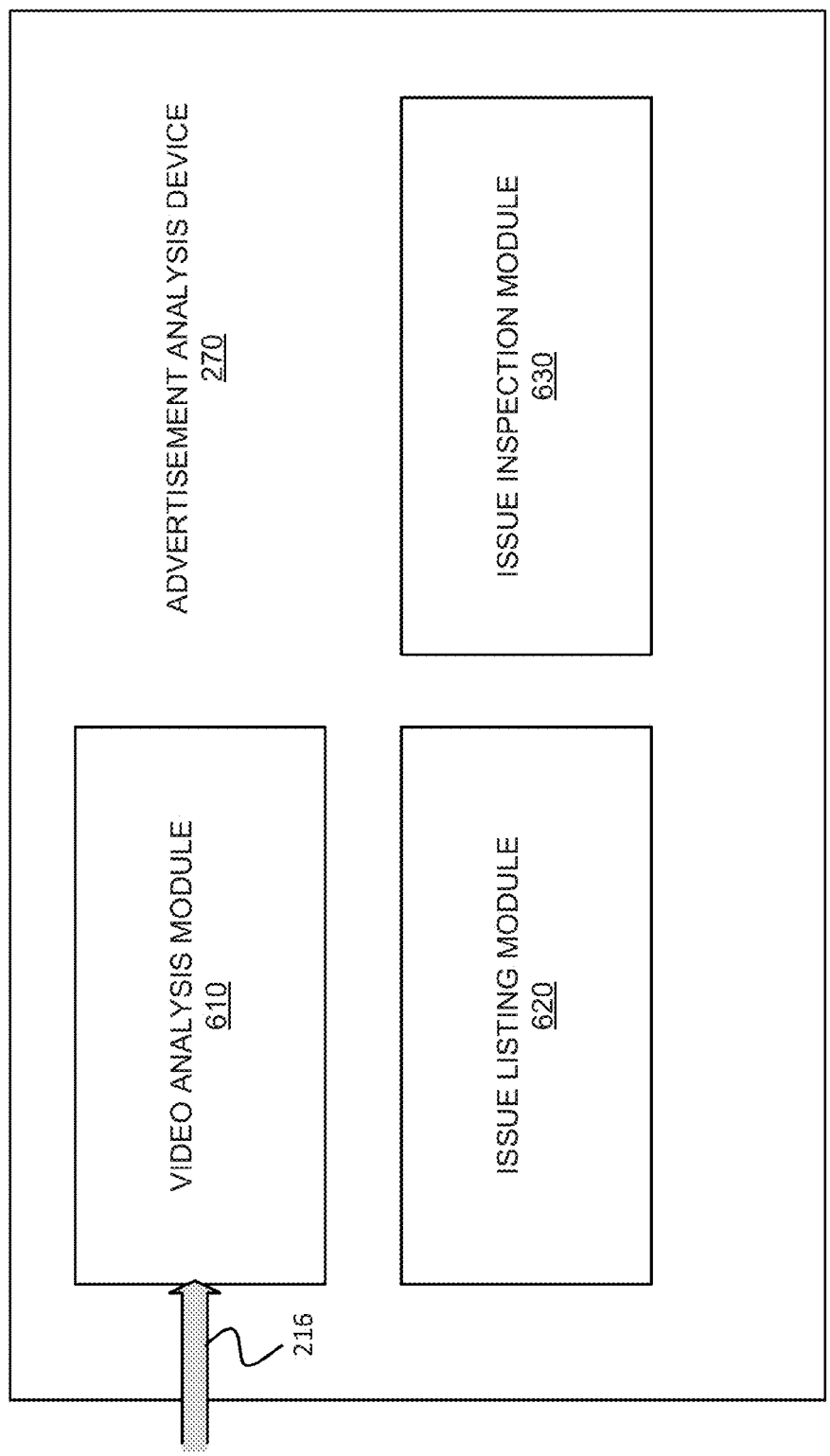
FIG. 6 is a diagram of exemplary functional components of the advertisement analysis device of FIG. 2.

FIG. 6 is a diagram of exemplary functional components of advertisement analysis device 270. In one implementation, the functions described in connection with FIG. 6 may be performed by one or more components of device 300 (FIG. 3). As shown in FIG. 6, advertisement analysis device 270 may include a video analysis module 610, an issue listing module 620, and an issue inspection module 630.

Video analysis module 610 may receive and analyze video streams 216. For example, video analysis module 610 may receive notification from advertisement monitor device 230 (or advertisement monitor device 500 in a DLNA-based implementation) that advertisement monitor device 230 has video streams 216 available for streaming/download. Video analysis module 610 may receive a dynamic list of available live streams (video streams 216). The list of available video streams 216 may identify video streams corresponding to different target groups associated with a same advertisement insertion event. The video streams 216 may include targeted advertisements for each target group. Video analysis module 610 may prepare resources to receive the video streams 216 and notify advertisement monitor device 230 that advertisement monitor device 230 may send the video streams 216.

Video analysis module 610 may analyze the video stream 216 to identify issues associated with each advertisement insertion event. According to an example, video analysis module 610 may perform a deep packet inspection as well as video inspection of the video streams 216 to identify instances of issues in association with advertisement insertion events. The issues may include streaming quality issues, channel change latency issues (e.g., from a video program to an advertisement), channel change errors (e.g., that the correct advertisement for a target group is displayed or whether the video stream 216 returns to the program after the advertisement), pixilation issues, timing errors, absent advertisements, video quality issues, channel change quality issues, etc. Video analysis module 610 may forward identified issues to issue listing module 620.

Issue listing module 620 may store listed instances of issues in video streams 216 in association with metadata for the video streams 216. For example, issue listing module 620 may receive information regarding an identified issue, an associated advertisement insertion event, metadata, etc. Issue listing module 620 may generate a report that lists the unique ID and published metadata associated with the video stream 216, such as a uniform resource locator (URL) of the video stream 216. Issue listing module 620 may also include information regarding a target group, an advertiser, and a particular advertisement for the advertisement insertion event. Issue listing module 620 may provide an issue list that an operator may read to identify issues. The operator may request identified video streams 216 and visually examine the recorded video in light of the reported issues.

Issue inspection module 630 may provide access to video streams 216 based on identified issues. Issue inspection module 630 may provide an interface and ability for the network personnel to perform issue reporting and correction processes. For example, issue inspection module 630 may provide a live link that connects the user to the video stream 216 at the advertisement insertion event at which the issue occurred. Issue inspection module 630 may provide a listing as a selectable document accessible in a GUI of an authorized device, such as issue inspection table 700, shown in FIG. 7. Issue inspection module 630 may also allow the operator to examine stored video streams 216 (and advertisement insertion events) based on the unique ID and metadata associated with the advertisement insertion event, such as a timestamp etc.

FIG. 7 illustrates an exemplary issue inspection table 700. As shown in FIG. 7, issue inspection table 700 may include records of issues corresponding to different advertisement insertion events, target groups or a combination of advertisement insertion events and target groups. A unique record is shown in each row of FIG. 7 for each advertisement break 702 on a target group by target group basis. Each record may include a particular advertisement break 702, a group ID 704, an advertisement 706, an issue 708, a time 710, and an advertisement insertion event link 712. Issue inspection table 700 includes information that may be presented in a GUI of a device to provide access for network personnel to perform issue inspection based on advertisement insertion events. The particular arrangement and types of information in issue inspection table 700 and illustrated in FIG. 7 is included for simplicity.

Advertisement break 702 indicates a particular advertisement break on a video program received in video stream 216. For example, advertisement break 1 may represent a thirty second time slot after a first segment of a cooking program. Advertisement break 2 may represent a thirty second time slot after a second segment on a news program. The entry for advertisement break 702 may include information indicating a particular channel at which the video program is broadcast, and a preceding segment of a particular program (e.g., an advertisement break may occur after a first segment of a news program).

Group ID 704 indicates a particular target group for targeted advertisements included in the video stream 216. For example, group ID 704-a to group ID 704-d may each represent a particular zip code associated with target groups of subscriber devices (STBs 142).

Advertisement 706 indicates a particular advertisement that is scheduled to be shown. For example, advertisement 706-a may represent a commercial for kitchen utensils, advertisement 706-b may represent a travel commercial and advertisement 706-c may represent a dog food commercial, etc.

Issues 708 may occur where the wrong advertisement is inserted, or when the advertisement is inserted at a wrong time (e.g., too early), etc. The listed issues may include streaming quality issues, channel change latency, channel change errors or a combination of those types of issues. For example, issue 1 may be noted as an incorrect advertisement for a target group, issue 2 may be noted as pixilation issues, etc.

Time 710 is a time at which the advertisement insertion event in which the issue occurs in the video program/video stream 216. In some instances, issue inspection table 700 may include additional information regarding a specific time at which issues occur (e.g., after ten seconds of an advertisement).

Advertisement insertion event link ("ad link") 712 may provide a link for the network personnel to request video streams 216 stored by advertisement monitor device 230. The link may include a URL for the video stream 216 (i.e., to the advertisement insertion event at which the issue occurs).

Figure 8:
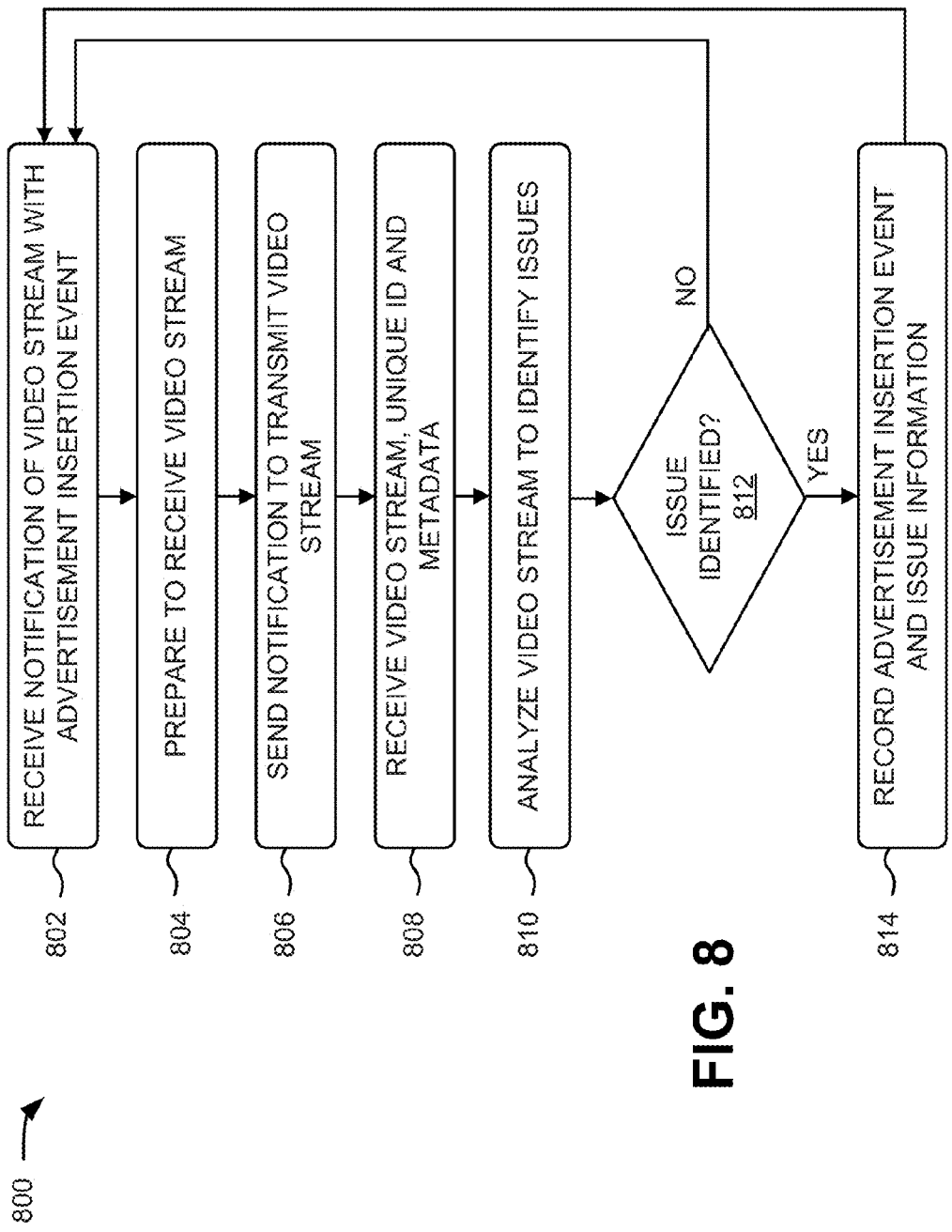
FIG. 8 is a flowchart of an exemplary process for performing advertisement analysis and issue correlation.

FIG. 8 is a flowchart of an exemplary process 800 for generating a report of issues associated with advertisement insertion events. Process 800 may execute in advertisement analysis device 270. In another implementation, some or all of process 800 may be performed by another device or group of devices, including or excluding advertisement analysis device 270. It should be apparent that the process discussed below with respect to FIG. 8 represents a generalized illustration and that blocks/steps may be added or existing blocks/steps may be removed, modified or rearranged without departing from the scope of process 800.

At block 802, advertisement analysis device 270 may receive notification of video streams 216 that include advertisement insertion events. For example, advertisement monitor device 500 may receive a list of video streams 216 from advertisement monitor device 230 that includes video specifications, file sizes, etc. The lists may also include scheduled times for the advertisement insertion events.

At block 804, advertisement analysis device 270 may prepare to receive the video stream 216. For example, advertisement analysis device 270 may prepare resources such as a cache or space on a storage device at which the video stream 216 may be stored during the analysis process.

Advertisement analysis device 270 may send a notification to advertisement monitor device 230 to transmit the video stream 216 (block 806). For example, advertisement monitor device 500 may send a signal to advertisement monitor device 230 to begin streaming the listed and requested video streams 216 in a particular video file format.

Advertisement analysis device 270 may receive video streams 216 that include a unique ID and associated metadata for the video stream 216 (block 808). For example, advertisement analysis device 270 may receive video streams 216 with metadata indicating a time, a target group, a scheduled advertisement, a program identifier (e.g., an episode, or a name), an advertisement identifier (e.g., a name, a brand, or a product), etc.

Advertisement analysis device 270 may analyze video stream 216 to identify whether there are any issues associated with advertisement insertion events in the video streams 216 (block 810). For example, advertisement analysis device 270 may perform deep packet inspection of the video stream 216 to identify protocol non-compliance, or defined criteria based on the scheduled advertisement insertion events. Advertisement analysis device 270 may access a schedule of video programs and advertisement breaks on a target group basis (e.g., by communicating with media schedule 250) and compare the received packets with the expected packets. Advertisement analysis device 270 may test video streams to identify latency and timing issues with transitions between advertisements and video programs. For example, advertisement analysis device 270 may test the video stream to determine whether the latency of the video stream 216 is within boundaries of a predetermined acceptable threshold of latency of the video stream 216.

If no issues are detected in the video stream 216 (block 812: NO), advertisement analysis device 270 may continue to receive additional video streams 216 (i.e., block 802 may repeat). Additionally, in some instances, advertisement analysis device 270 may report to advertisement monitor device 230 that the video stream 216 is ready to be viewed.

However, if issues are detected in the video stream 216 (block 812: YES), advertisement analysis device 270 may record the advertisement insertion event and issue information (block 814). For example, advertisement analysis device 270 may record an advertisement insertion event and issue information in a similar manner as described with respect to issue inspection table 700 described with respect to FIG. 7. Advertisement analysis device 270 may notify advertising monitor device 230 that there are issues associated with video stream 216. Additionally, advertisement analysis device 270 may identify a common property or attribute (e.g., of the type of signals, the advertisements, network elements, such as transmitters or STBs 142, etc., which may be a source of the issue) associated with the identified issue and send a signal to adjust a process of sampling target groups based on the identified common property. For example, in an instance in which there are different protocols associated with the STBs 142, advertisement analysis device 270 may send a signal that results in increased sampling of client modules 512 representing a particular type of STB 142 that correlates with an issue which is identified.

Systems and/or methods described herein may implement report generation for advertisement insertion events associated with targeted advertisements. The systems may combine an advertisement monitor device, a QAM tuner bank, and an advertisement analysis device.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
    receiving, from an advertisement monitoring device, notification of a video stream that includes at least one advertisement insertion event, wherein each advertisement insertion event includes a scheduled transition between a video program and at least one targeted advertisement associated with a corresponding target group of set top boxes and the advertisement monitoring device is to monitor the video stream for each advertisement insertion event;
    preparing resources to receive and record the video stream, wherein the resources are different than the corresponding target group of set top boxes;
    sending notification to the advertisement monitoring device to begin transmitting the video stream;
    recording, at the resources, the video stream;
    storing the recorded video stream with a unique identifier (ID) for the recorded video stream and associated metadata for the recorded video stream;
    analyzing the recorded video stream to identify at least one error in association with a particular advertisement insertion event;
    correlating the at least one error with at least one recorded advertisement insertion event; and
    generating a report that includes the identified at least one error, the unique ID, and the associated metadata for the recorded video stream.

2. The computer-implemented method of claim 1, wherein each target group is determined based on one or more of a zip code, a demographic characteristic or a zone ID.

3. The computer-implemented method of claim 1, wherein the at least one error includes at least one of a timing error, an absent advertisement, a stream quality issue, a video quality issue, or a channel change latency issue.

4. The computer-implemented method of claim 1, wherein analyzing the recorded video stream to identify the at least one error further comprises:
    analyzing the recorded video stream based on one of deep packet inspection or video inspection.

5. The computer-implemented method of claim 1, wherein analyzing the recorded video stream to identify the at least one error further comprises:
    analyzing the recorded video stream for a latency issue based on a predetermined threshold of latency of the video stream.

6. The computer-implemented method of claim 1, wherein analyzing the recorded video stream to identify the at least one error further comprises:
    analyzing the recorded video stream based on a schedule for the video program that includes advertisement breaks.

7. The computer-implemented method of claim 1, further comprising:
    identifying a common property associated with the identified error; and sending a signal to adjust a process of sampling target groups based on the identified common property.

8. The computer-implemented method of claim 1, wherein generating the report further comprises:
    generating the report to include a link to play the recorded video stream at the particular advertisement insertion event, wherein each of the correlated at least one recorded advertisement insertion event is to be provided via hyperlink based on a user request.

9. The computer-implemented method of claim 1, wherein generating the report further comprises:
    generating the report to identify one or more of the target group of set top boxes, an advertisement identifier, or a program identifier associated with the at least one error.

10. The computer-implemented method of claim 1, wherein the metadata includes information based on at least one of the targeted advertisement or the video program.

11. A device, comprising:
    a memory to store a plurality of instructions; and
    a processor configured to execute the instructions in the memory to:
        receive, from an advertisement monitoring device, notification of a list of video streams, wherein each video stream includes at least one advertisement insertion event, wherein each advertisement insertion event includes a scheduled transition between a video program and at least one targeted advertisement associated with a corresponding target group of set top boxes and the advertisement monitoring device is to monitor the video stream for each advertisement insertion event;

prepare resources to receive and record the video streams, wherein the resources are different than the corresponding target group of set top boxes;

send notification to the advertisement monitoring device to begin transmitting the video streams;

record, at the resources, the video streams;

store the recorded video streams with a unique identifier (ID) for each video stream and associated metadata for each video stream;

analyze each of the recorded video streams to identify at least one error in association with a corresponding advertisement insertion event;

correlate the at least one error with at least one recorded advertisement insertion event; and generate a report that includes the identified at least one error, the unique ID associated with the recorded video stream, and the associated metadata for the recorded video stream for each identified at least one issue.

12. The device of claim 11, wherein the list of video streams includes video streams corresponding to different target groups associated with a same advertisement insertion event.

13. The device of claim 11, where the processor is further to:
provide access to the recorded video streams based on the identified at least one error.

14. The device of claim 11, wherein, when analyzing each of the recorded video streams to identify the at least one error, the processor is further to:
analyze each of the recorded video streams based on one of deep packet inspection or video inspection.

15. The device of claim 11, wherein, when analyzing each of the recorded video streams to identify the at least one error, the processor is further to:
analyze the recorded video streams for a latency issue based on a predetermined threshold of latency of the video stream.

16. The device of claim 11, wherein, when analyzing the recorded video streams to identify the at least one error, the processor is further to:
analyze the recorded video streams based on a schedule for the video program that includes advertisement breaks.

17. The device of claim 11, wherein the processor is further to:
present the report as a selectable list that provides access to the correlated at least one recorded advertisement insertion event in a graphic user interface of an associated display device.

18. The device of claim 11, wherein, when generating the report, the processor is further to:
generate the report to include a link to play the recorded video stream at the advertisement insertion event with displayed metadata, wherein each of the correlated at least one recorded advertisement insertion event is to be provided via hyperlink based on a user request.

19. The device of claim 11, wherein, when generating the report, the processor is further to:
generate the report to identify one or more of the target group of set top boxes, an advertisement identifier, or a program identifier associated with the at least one error.

20. A system, comprising:
a plurality of quadrature amplitude modulation (QAM) tuners;
a device including a memory to store a plurality of instructions;
an advertisement monitor device to monitor a plurality of video streams for advertisement insertion events and to output at least one video stream including the advertisement insertion events based on targeted advertisements associated with a target group; and
a processor configured to execute the instructions in the memory to:
receive, from the advertisement monitoring device, notification of a list of video streams, wherein each video stream includes at least one advertisement insertion event, wherein each advertisement insertion event includes a scheduled transition between a video program and at least one targeted advertisement associated with a corresponding target group of set top boxes;
prepare resources to receive and record the video streams, wherein the resources are different than the corresponding target group of set top boxes;
send notification to the advertisement monitoring device to begin transmitting the video streams;
record, at the resources, the video streams;
storing the recorded video stream with a unique identifier (ID) for associated with each recorded video stream and associated metadata for each recorded video stream;
analyze each of the recorded video streams to identify at least one error in association with a corresponding advertisement insertion event;
correlate the at least one error with at least one recorded advertisement insertion event; and
generate a report that includes the identified at least one error, the unique ID associated with the recorded video stream, and the associated metadata for the recorded video stream for each identified at least one issue.

* * * * *